US011214124B2

(12) United States Patent
Seidl

(10) Patent No.: US 11,214,124 B2
(45) Date of Patent: Jan. 4, 2022

(54) EXTRACTION DEVICE FOR A MOTOR VEHICLE

(71) Applicant: Bayerische Motoren Werke Aktiengesellschaft, Munich (DE)

(72) Inventor: Josef Seidl, Strasskirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 340 days.

(21) Appl. No.: 16/167,757

(22) Filed: Oct. 23, 2018

(65) Prior Publication Data

US 2019/0054802 A1 Feb. 21, 2019

Related U.S. Application Data

(63) Continuation of application No. PCT/EP2017/058230, filed on Apr. 6, 2017.

(30) Foreign Application Priority Data

May 20, 2016 (DE) ...................... 10 2016 208 694.4

(51) Int. Cl.
 *B60H 1/24* (2006.01)
 *B62J 15/00* (2006.01)
 (Continued)

(52) U.S. Cl.
 CPC ............... *B60H 1/244* (2013.01); *B60H 1/26* (2013.01); *B60K 11/06* (2013.01); *B60K 11/08* (2013.01);
 (Continued)

(58) Field of Classification Search
 CPC .......... B60H 1/244; B60H 1/26; B60K 11/06; B60K 11/08; B60K 13/04; B60K 13/06;
 (Continued)

(56) References Cited

U.S. PATENT DOCUMENTS 4,334,589 A 6/1982 Asakura et al.
4,549,762 A 10/1985 Burk et al.
(Continued)

FOREIGN PATENT DOCUMENTS

CN 1663871 A 9/2005
CN 1757535 A 4/2006
(Continued)

OTHER PUBLICATIONS

International Search Report (PCT/ISA/210) issued in PCT Application No. PCT/EP2017/058230 dated Aug. 1, 2017 with English translation (seven pages).

(Continued)

*Primary Examiner* — Kenneth J Hansen
*Assistant Examiner* — Dana K Tighe
(74) *Attorney, Agent, or Firm* — Crowell & Moring LLP

(57) ABSTRACT

An extraction device is provided for a motor vehicle, in particular for a motor bike or for a motor vehicle similar to a motor bike. The extraction device includes at least one duct-like air-guide which has at least one opening which is arranged in or at an exhaust-air region of a ventilated vehicle component of the motor vehicle, such as engine, gearbox or the like, and which is extended between the used-air region of the vehicle component and a rear wheel of the motor vehicle, and at least one suction apparatus which is connectable or is connected to the air-guide and in which a negative pressure can be produced in order to suck air out of the exhaust-air region via the at least one air-guide.

8 Claims, 2 Drawing Sheets

(51) Int. Cl.
- *B60K 11/08* (2006.01)
- *B62K 11/04* (2006.01)
- *B60K 11/06* (2006.01)
- *B60H 1/26* (2006.01)
- *B60K 13/04* (2006.01)
- *B60K 13/06* (2006.01)
- *B62D 25/16* (2006.01)
- *B60R 19/00* (2006.01)

(52) U.S. Cl.
CPC .............. *B60K 13/04* (2013.01); *B60K 13/06* (2013.01); *B62D 25/16* (2013.01); *B62J 15/00* (2013.01); *B62K 11/04* (2013.01); *B60R 2019/002* (2013.01)

(58) Field of Classification Search
CPC .......... B62D 25/16; B62J 15/00; B62K 11/04; B60R 2019/002
USPC ........................................................ 454/165
See application file for complete search history.

(56) References Cited

U.S. PATENT DOCUMENTS

| | | | |
|---|---|---|---|
| 4,618,020 | A | 10/1986 | Noda et al. |
| 5,577,747 | A | 11/1996 | Ogawa et al. |
| 8,763,735 | B2 | 7/2014 | Watanabe |
| 9,085,226 | B2 | 7/2015 | Matsuda et al. |
| 2005/0051372 | A1 | 3/2005 | Guertler |
| 2005/0178597 | A1 | 8/2005 | Arnold |
| 2006/0065455 | A1 | 3/2006 | Saiki et al. |
| 2009/0194354 | A1 | 8/2009 | Kubo et al. |
| 2010/0078249 | A1 | 4/2010 | Nishiura et al. |
| 2012/0103716 | A1 | 5/2012 | Fujihara et al. |
| 2013/0081896 | A1 | 4/2013 | Nakamura |
| 2014/0332295 | A1 | 11/2014 | Uozu et al. |
| 2017/0174282 | A1 | 6/2017 | Seidl et al. |

FOREIGN PATENT DOCUMENTS

| | | |
|---|---|---|
| CN | 101309829 A | 11/2008 |
| CN | 101712357 A | 5/2010 |
| CN | 103029777 A | 4/2013 |
| DE | 900 539 B | 12/1953 |
| DE | 30 26 970 A1 | 2/1981 |
| DE | 103 41 642 B3 | 4/2005 |
| DE | 10 2014 222 297 A1 | 5/2016 |
| EP | 2 639 092 A1 | 9/2013 |
| JP | 2010-83371 A | 4/2010 |
| JP | 2012-86690 A | 5/2012 |
| JP | 2012-96616 A | 5/2012 |

OTHER PUBLICATIONS

German-language Written Opinion (PCT/ISA/237) issued in PCT Application No. PCT/EP2017/058230 dated Aug. 1, 2017 (six pages).

German-language Search Report issued in counterpart German Application No. 10 2016 208 694.4 dated Mar. 6, 2017 with partial English translation (13 pages).

Chinese-language Office Action issued in Chinese Application No. 201780012631.7 dated Sep. 14, 2020 with English translation (12 pages).

Chinese Office Action issued in Chinese application No. 201780012631.7 dated May 10, 2021, with English translation (Sixteen (16) pages).

EXTRACTION DEVICE FOR A MOTOR VEHICLE

CROSS REFERENCE TO RELATED APPLICATIONS

This application is a continuation of PCT International Application No. PCT/EP2017/058230, filed Apr. 6, 2017, which claims priority under 35 U.S.C. § 119 from German Patent Application No. 10 2016 208 694.4, filed May 20, 2016, the entire disclosures of which are herein expressly incorporated by reference.

BACKGROUND AND SUMMARY OF THE INVENTION

The invention relates to an extraction device for a motor vehicle, in particular for a motor bike or for a motor vehicle similar to a motor bike.

In motor vehicles, in particular motor bikes or motor vehicles similar to motor bikes, radiators and fans are arranged in the front region of the motor vehicle. Here, the relative wind is used to increase the charging pressure.

During running operation of the motor vehicle there can be established, with respect to the surroundings, a negative pressure area in the exhaust-air region of a vehicle component to be vented, such as an engine, gearbox or the like, said negative pressure area additionally serving to vent the vehicle component. However, the strength of the negative pressure area is dependent on the contour of the motor vehicle, including driver and payloads, and on the respective driving speed.

As a result of this, a bank-up region can also be established in the exhaust-air region, in particular if sufficient air removal is not made possible, which makes venting of the exhaust-air region more difficult.

An object of an exemplary embodiment of the invention is to provide an extraction device by which improved air removal from the exhaust-air region is made possible.

This object is achieved by an extraction device for a motor vehicle, in particular for a motor bike or for a motor vehicle similar to a motor bike, having at least one duct-like air-guide which has at least one opening which is arranged in or at an exhaust-air region of a ventilated vehicle component of the motor vehicle, such as an engine, gearbox or the like, and which air-guide extends between the exhaust-air region of the vehicle component and a rear wheel of the motor vehicle, and having at least one suction device which can be or is connected to the air-guide and in which a negative pressure can be generated in order to suck air out of the exhaust-air region via the at least one air-guide.

By virtue of the fact that, at least during operation of the motor vehicle, air can be sucked out of the exhaust-air region by means of the suction device via the air-guide, the air removal from the exhaust-air region is improved. As a result, moreover, venting of the vehicle component to be ventilated is improved.

The exhaust-air region of the vehicle component can be arranged in principle inside or outside of a housing containing the vehicle component, and the air-guide can project into the housing.

In one embodiment of the suction device, the exhaust-air region is arranged outside the housing of the vehicle components and the opening of the duct-like air-guide is likewise arranged outside the housing.

A motor vehicle similar to a motor bike is understood to include hereinbelow motor vehicles such as tilting vehicles, motor bikes, motorcycles, motor scooters, in particular two-, three- or four-wheeled motor scooters, trikes, quads or the like.

The suction device can be formed in principle by any type of device that generates negative pressure, for example an electric motor-operated or fuel-operated pump. However, it proves to be advantageous if the suction device comprises at least one suction duct which is at least virtually completely enclosed and formed by at least one cover and by an, in particular changing, portion of an outer surface of the rear wheel of the motor vehicle and into which air can be supplied via an inlet opening by rotation of the rear wheel, can be moved in the suction duct over a path which is substantially concentric to the rear wheel and can be discharged again via an outlet opening.

During operation of the motor vehicle, the rear wheel rotates continuously. A changing portion of an outer surface of the rear wheel of the motor vehicle is therefore understood to mean the portion of the outer surface of the rear wheel that interacts in each case with the cover and forms the suction duct.

The rotation of the rear wheel causes air in the suction duct to be accelerated in the direction of rotation of the rear wheel and to be transported from the inlet opening to the outlet opening. By virtue of the fact that the air-guide is connected to the suction device, the air accelerated in the suction duct acts like a suction jet pump and sucks in air via the air-guide.

In such a case, the suction device is formed by components of the motor vehicle that are already present in any case and can be realized in a component-reduced manner. Furthermore, no additional drive has to be provided, with the result that the drive can be designed in a weight-reduced and energy-saving manner.

If the motor vehicle comprises a plurality of rear wheels, a plurality of suction devices can be provided or one suction device can comprise a plurality of suction ducts, with a suction duct being able to be assigned to each rear wheel.

Moreover, it proves advantageous if the suction duct of the suction device comprises at least one portion which is designed as a mixing chamber, is arranged between the inlet opening and the outlet opening and in which the air-guide opens into the suction duct, and if the suction duct comprises, between the inlet opening and the mixing chamber, a region having a cross section which tapers in the direction of movement of the air, which region in particular has its narrowest cross section adjoining the mixing chamber.

If the suction device comprises a portion designed as a mixing chamber, the air accelerated by the rear wheel acts like a free jet of a suction jet pump.

If the cross section of the suction duct tapers in the direction of the mixing chamber and comprises its narrowest cross section adjoining the mixing chamber, the air moved by the rear wheel has its highest speed there. As a result, the suction jet effect is further increased.

Furthermore, it proves advantageous if the air-guide opens into the suction duct, in particular into the mixing chamber of the suction duct, transversely, obliquely or tangentially to the path of the suction duct that is concentric to the rear wheel, and/or if the air-guide has a cross section which is constant from the opening in the direction of the mixing chamber, which continuously tapers or which comprises a first region in which it continuously tapers and a second region in which it continuously widens.

By virtue of the fact that the air-guide can open transversely, obliquely or tangentially into the suction duct, and that the cross section of the air-guiding duct can be configured in a variety of ways, the suction jet effect can be predetermined. Moreover, the extraction device can thereby be adapted to the geometric conditions of the motor vehicle. For example, it is made possible for the opening of the air-guiding duct to be arranged above, level with and below the vehicle component to be vented.

In one embodiment of the extraction device, the cover comprises at least one upper covering part which extends from the inlet opening of the suction duct to the mixing chamber and which is arranged substantially above the rear wheel on its side opposite to the roadway, and at least one lower covering part which extends from the mixing chamber to the outlet opening of the suction duct and which is arranged on a side of the rear wheel that faces the front wheel.

The upper covering part and the lower covering part can form the cover as a common component or be formed from components which can be separated from one another. If the upper covering part and the lower covering part are formed from components which can be separated from one another, the two of them can be joined together in the manner of shells. Moreover, the cover can be formed from two half-shells, with one half-shell comprising both one side of the upper covering part and one side of the lower covering part. In such a case, the cover comprises a left and a right shell.

If the upper covering part and the lower covering part comprise a common component, in particular an injection-molded part, assembly is simplified and the cover is component-reduced.

The cover and the changing portion of the outer surface of the rear wheel form the suction duct. The latter is at least virtually enclosed by the cover and the outer surface of the rear wheel. By virtue of the rotation of the rear wheel, a gap has to be provided between the outer surface of the rear wheel and the cover, this gap being sufficiently wide to avoid unwanted friction between the rear wheel and cover and at the same time to keep the pressure loss low. Here, it proves to be advantageous if the cover, in particular the upper and/or the lower covering part, extends to the widest point of the rear wheel, in particular laterally reaches over the rear wheel at its widest point.

If the rear wheel is mounted on a rear wheel swing arm of the motor vehicle, it proves advantageous if the cover, in particular the upper and/or the lower covering part and/or the air-guide, are fastened to a rear wheel swing arm of the motor vehicle.

In such a case, relative movements between the cover and the rear wheel are reduced.

In one embodiment of the extraction device, the opening in the air-guide takes the form of an intake or funnel, and the suction direction in which air is sucked out of the exhaust-air region extends transversely, obliquely or parallel to the direction of travel of the motor vehicle.

The funnel-like intake makes it possible for pressure losses to be reduced. As a result, the venting of the exhaust-air region is improved. The fact that the suction direction can extend transversely, obliquely or parallel to the direction of travel of the motor vehicle means that the air-guide can be adapted to structural and spatial conditions.

Furthermore, it proves to be expedient if the outlet opening of the suction duct, in particular the end of the lower covering part that faces the roadway, is spaced apart from the roadway so as to have a defined clearance from the roadway.

A defined clearance is understood to mean that the distance between the lower covering part and roadway is selected at least such that it is possible to overcome obstacles which are to be driven over.

Finally, it proves to be advantageous if the air-guide and the cover comprise a common component, in particular a rear wheel cladding, such as a mudguard, and/or if the air-guide is formed and is at least virtually completely enclosed by a portion of the upper covering part and by a portion of the lower covering part.

In such a case, the extraction device can be designed in a component-reduced and compact manner. Moreover, assembly is facilitated.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
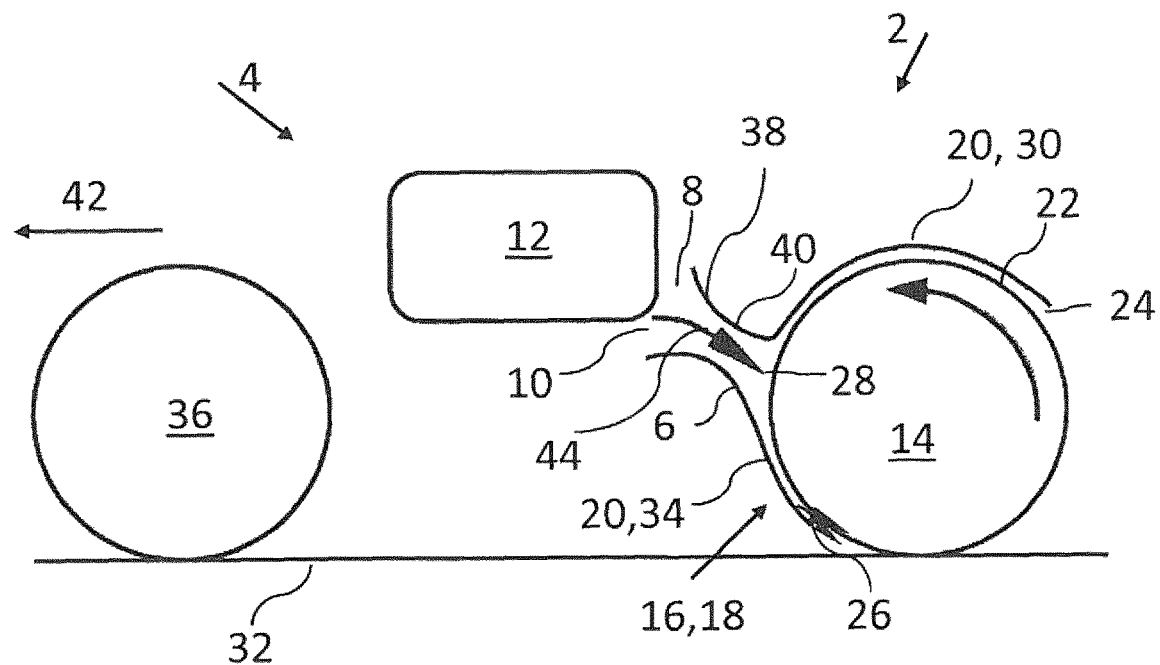
FIG. 1 shows a first exemplary embodiment of the extraction device.
Figure 2:
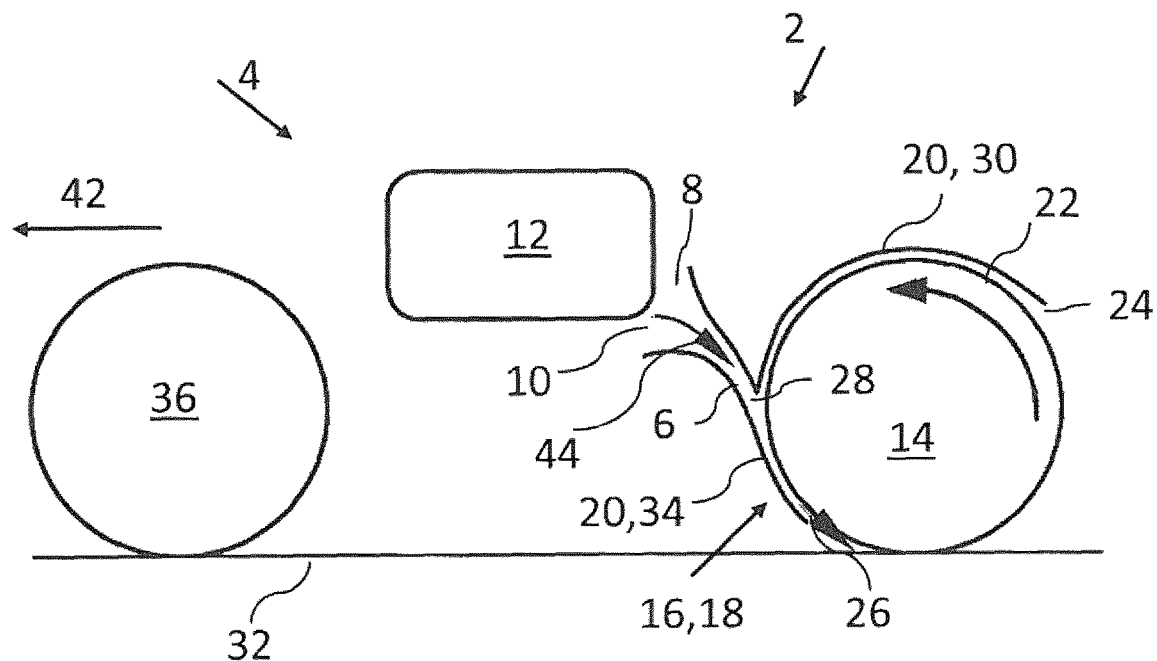
FIG. 2 shows a second exemplary embodiment of the extraction device.
Figure 3:
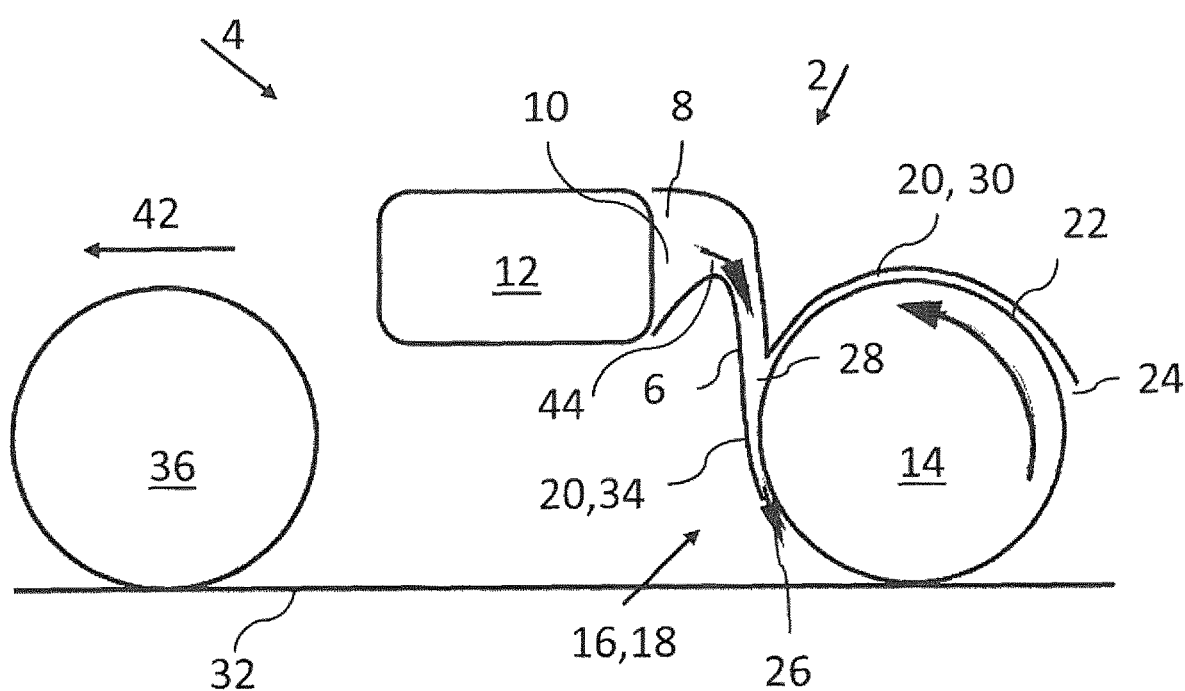
FIG. 3 shows a third exemplary embodiment of the extraction device.

FIGS. 1 to 3 show exemplary embodiments of an extraction device, provided overall with the reference sign 2, for a motor vehicle 4 (only schematically illustrated in the figures). The motor vehicle 4 illustrated in the figures comprises a motor bike or a motor vehicle 4 similar to a motor bike.

The extraction device 2 comprises at least one duct-like air-guide 6 which has at least one opening 8. The air-guide 6 is arranged with the opening 8 in an exhaust-air region 10 of a ventilated vehicle component 12 of the motor vehicle 4. By means of the opening 8, air can be sucked out of the exhaust-air region 10 via the air-guide 6. In the exemplary embodiments shown in the figures, the air-guide 6 extends from the vehicle component 12 to be vented, in particular from its exhaust-air region 10, in the direction of a rear wheel 14 of the motor vehicle 4.

Moreover, the extraction device 2 comprises a suction device 16 which is connected to the air-guide and in which a negative pressure can be generated with respect to the exhaust-air region 10. By means of the suction device 16, air can be sucked out of the exhaust-air region 10 through the air-guide 6 and the exhaust-air region 10 can thereby be vented.

The suction device 16 of the exemplary embodiments shown in the figures in each case comprises a suction duct 18. The latter is formed by a cover 20 and by a portion 22 of an outer surface of the rear wheel 14 and at least virtually completely enclosed by both. Rotation of the rear wheel 14 causes air to be fed into the suction duct 18 via an inlet opening 24 and to be discharged from the suction duct 18 via an outlet opening 26.

Moreover, the suction ducts 18 shown in the figures in each case comprise a portion which is designed as a mixing chamber 28, is arranged between the inlet opening 24 and the outlet opening 26 and into which the air-guide 6 opens.

The cover 20 comprises an upper covering part 30 which extends substantially from the inlet opening 24 to the mixing chamber 28 and is arranged above the rear wheel 14 on its side opposite to a roadway 32, and a lower covering part 34 which extends substantially from the mixing chamber 28 to the outlet opening 26 and which is arranged on a side of the rear wheel 14 that faces a front wheel 36.

FIG. 1 shows a first exemplary embodiment of the extraction device 2. In this, the opening 8 takes the form of an intake or funnel. The air-guide 6 extends from the opening 8 in the direction of the mixing chamber 28 at first by a first region 38 which comprises a continuously tapering cross section, and by a second region 40 which adjoins this and comprises a continuously widening cross section.

The opening 8 of the air-guide 6 is arranged obliquely to the direction of travel 42, with the result that the suction direction 44 likewise extends obliquely to the direction of travel 42.

It is evident from the arrangement according to FIG. 1 that the air-guide 6 opens into the mixing chamber 28 perpendicularly to the concentric path of the suction duct 18.

FIG. 2 shows a second exemplary embodiment of the extraction device 2. In this, the opening 8 likewise takes the form of an intake or funnel. The air-guide 6 extends from the opening 8 in the direction of the mixing chamber 28 with a continuously tapering cross section.

The opening 8 of the air-guide 6 is formed obliquely to the direction of travel 42, with the result that the suction direction 44 likewise extends obliquely to the direction of travel 42.

It is evident from the arrangement according to FIG. 2 that the air-guide 6 opens into the mixing chamber 28 obliquely to the concentric path of the suction duct 18.

FIG. 3 shows a third exemplary embodiment of the extraction device 2. In this, the opening 8 likewise takes the form of an intake or funnel and extends over the entire height of the vehicle component 12. The air-guide 6 extends from the opening 8 in the direction of the mixing chamber 28 at first with a continuously tapering cross section.

The opening 8 of the air-guide 6 is formed in the direction of travel 42. The air-guide 6 extends substantially perpendicularly to the direction of travel 42.

It is evident from the arrangement according to FIG. 3 that the air-guide 6 opens into the mixing chamber 28 tangentially to the concentric path of the suction duct 18.

The mode of operation of the extraction device will be described below.

During operation of the motor vehicle, the rear wheel 14 is set in a rotational movement. Within the suction duct 18, the air present there is moved by the rotation of the rear wheel 14 and moved in the direction of the outlet opening 26.

The movement of the air increases the dynamic pressure component in the air in the suction duct, the static pressure component dropping. As soon as the static pressure component in the mixing chamber 28 has dropped below the value of the static pressure component in the exhaust-air region 10, air flows out of the exhaust-air region 10 via the air-guide 6 into the extraction device 2.

LIST OF REFERENCE SIGNS

2 Extraction device
4 Motor vehicle
6 Air-guide
8 Opening
10 Exhaust-air region
12 Vehicle component
14 Rear wheel
16 Suction device
18 Suction duct
20 Cover
22 Portion
24 Inlet opening
26 Outlet opening
28 Mixing chamber
30 Upper covering part
32 Roadway
34 Lower covering part
36 Front wheel
38 First region
40 Second region
42 Direction of travel
44 Suction direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An extraction device for a motor vehicle, comprising:
    an air-guide which has at least one opening arranged in or at an exhaust-air region of a ventilated vehicle component of the motor vehicle, wherein
    the air-guide extends between the exhaust-air region of the vehicle component and a rear wheel of the motor vehicle; and
    at least one suction device which is connectable to the air-guide and in which a negative pressure is generated in order to suck air out of the exhaust-air region via the air-guide;
    wherein the suction device comprises a suction duct which is substantially enclosed and formed by a cover and by a portion of an outer surface of the rear wheel;
    wherein the air-guide is formed and substantially enclosed by a portion of an upper covering part and by a portion of a lower covering part of the cover and wherein the portion of the upper covering part and the portion of the lower covering part define a duct that extends away from the rear wheel and toward the ventilated vehicle component;
    wherein air can be supplied into the suction duct via an inlet opening by rotation of the rear wheel, wherein said air is movable in the suction duct over a path which is substantially concentric to the rear wheel and is dischargeable again via an outlet opening;
    wherein the suction duct of the suction device comprises at least one Portion which is formed as a mixing chamber, is arranged between the inlet opening and the outlet opening, and in which the air-guide opens into the suction duct;
    wherein the upper covering part extends from the inlet opening of the suction duct to the mixing chamber and is arranged substantially above the rear wheel on its side opposite to a roadway, and
    wherein the lower covering part extends from the mixing chamber to the outlet opening of the suction duct and is arranged on a side of the rear wheel that faces a front wheel.

2. The extraction device as claimed in claim 1, wherein the motor vehicle is a motor bike or a vehicle similar to a motor bike.

3. The extraction device as claimed in claim 1, wherein the suction duct comprises, between the inlet opening and the mixing chamber, a region having a cross section which tapers in the direction of movement of the air, said region having a narrowest cross section adjoining the mixing chamber.

4. The extraction device as claimed in claim 1, wherein
the air-guide opens into the mixing chamber of the suction duct, transversely, obliquely or tangentially to the path of the suction duct that is concentric to the rear wheel, and/or
the air-guide has a cross section which is constant from the opening in the direction of the mixing chamber, which continuously tapers or which comprises a first region in which it continuously tapers and a second region in which it continuously widens.

5. The extraction device as claimed in claim 1, wherein
the cover extends to the widest point of the rear wheel and laterally reaches over the rear wheel at its widest point.

6. The extraction device as claimed in claim 1, wherein
the cover is fastenable to a rear wheel swing arm of the motor vehicle.

7. The extraction device as claimed in claim 1, wherein
the opening in the air-guide takes the form of an intake or funnel, and
a suction direction in which the air is sucked out of the exhaust-air region extends transversely, obliquely or parallel to a direction of travel of the motor vehicle.

8. The extraction device as claimed in claim 1, wherein
the outlet opening of the suction duct at an end of the lower covering part that faces a roadway is spaced apart from the roadway so as to have a defined clearance from the roadway.

* * * * *